United States Patent [19]

Gobran

[11] Patent Number: 5,360,855
[45] Date of Patent: Nov. 1, 1994

[54] BLOCK POLYMERS AND OIL-CONTAMINATION TOLERANT ADHESIVE COMPOSITIONS

[75] Inventor: Ramsis Gobran, Roseville, Minn.

[73] Assignee: Minnesota Mining & Manufacturing Company, St. Paul, Minn.

[21] Appl. No.: 80,691

[22] Filed: Jun. 22, 1993

Related U.S. Application Data

[63] Continuation of Ser. No. 885,279, May 18, 1992, abandoned.

[51] Int. Cl.$^5$ .................... C09J 11/08; C09J 153/02
[52] U.S. Cl. .................... 524/274; 524/271; 524/482; 524/483; 524/484; 524/504; 524/505; 525/95; 525/98; 525/99; 525/314; 525/315; 525/316
[58] Field of Search ............... 524/274, 271, 504, 505, 524/482, 483, 484; 525/99, 314, 98, 95, 315, 316

[56] References Cited

U.S. PATENT DOCUMENTS

| | | | |
|---|---|---|---|
| 3,140,278 | 7/1964 | Kuntz | 260/94.2 |
| 3,507,934 | 4/1970 | Minor et al. | 260/876 |
| 3,526,606 | 9/1970 | Minekawa et al. | 260/5 |
| 3,553,051 | 1/1971 | Warrach et al. | 156/309 |
| 3,635,861 | 1/1972 | Russell | 260/27 |
| 3,728,193 | 4/1973 | McKeever et al. | 156/334 |
| 3,935,338 | 1/1976 | Robertson | 427/207 |
| 3,954,692 | 5/1976 | Downey | 260/33.6 AQ |
| 3,957,913 | 5/1976 | Roest et al. | 260/880 B |
| 3,991,002 | 11/1976 | Sedlo | 260/32.8 A |
| 3,993,613 | 11/1976 | Doss et al. | 260/27 R |
| 4,010,226 | 3/1977 | Crossland et al. | 260/880 B |
| 4,028,292 | 6/1977 | Korpman | 260/27 R |
| 4,080,348 | 3/1978 | Korpman | 260/27 BB |
| 4,089,913 | 5/1978 | Miki et al. | 260/880 B |
| 4,163,077 | 7/1979 | Antonsen et al. | 428/355 |
| 4,192,828 | 3/1980 | Witschard | 525/83 |
| 4,260,659 | 4/1981 | Gobran | 428/217 |
| 4,330,672 | 5/1982 | Hannon et al. | 528/493 |
| 4,374,957 | 2/1983 | Quirk | 525/314 |
| 4,391,949 | 7/1983 | St. Clair | 525/99 |
| 4,423,188 | 12/1983 | Witschard | 525/96 |
| 4,652,491 | 3/1987 | Gobran | 428/355 |
| 4,717,749 | 1/1988 | Tang et al. | 524/274 |
| 4,792,584 | 12/1988 | Shiraki et al. | 524/77 |
| 4,810,574 | 3/1989 | Ahner | 428/355 |
| 4,918,142 | 4/1990 | Saito et al. | 525/99 |
| 4,978,721 | 12/1990 | Wong | 525/289 |
| 5,015,695 | 5/1991 | Wong | 525/244 |
| 5,028,646 | 7/1991 | Miller et al. | 524/274 |

FOREIGN PATENT DOCUMENTS 2352045  5/1977  France ............... C09J 3/14

OTHER PUBLICATIONS

Database WPIL, Week 8339, Derwent Publications Ltd., London, GB; AN 83–774228 & JP,A,58 141 269 (Asahi Chemical Ind KK), 22 Aug. 1983, Abstract.

*Primary Examiner*—Paul R. Michl
*Assistant Examiner*—Olga Asinovsky
*Attorney, Agent, or Firm*—Gary L. Griswold; Walter N. Kirn; William J. Bond

[57] ABSTRACT

A novel 2-substituted butadiene block copolymer is provided which provides adhesives having superior adhesion and tolerance to oil contaminated surfaces. The elastomeric block has a glass transition temperature of less than about minus 65° C. with the 2 substituent being an alkyl group.

28 Claims, 2 Drawing Sheets

BLOCK POLYMERS AND OIL-CONTAMINATION TOLERANT ADHESIVE COMPOSITIONS

This is a continuation of application Ser. No. 07/885,279 filed May 18, 1992 now abandoned.

FIELD OF THE INVENTION

This invention relates to a normally tacky pressure-sensitive adhesive tape capable of functioning on surfaces contaminated with oil.

Synthetic rubber-based block copolymers are used extensively as a basis for pressure-sensitive adhesive compositions for a wide variety of uses. A problem that has proved to be particularly difficult is identified and a solution proposed.

BACKGROUND OF THE INVENTION

Pressure-sensitive adhesive compositions generally will function, under normal circumstances, against the substrate it was designed to be adhered to. However, conventional adhesives do not function adequately to that substrate when contaminated with grease or oil. The problem of adhering to oil contaminated surfaces with conventional pressure-sensitive adhesives, as a general problem, is recognized in the art. For example, U.S. Pat. No. 3,991,002 describes a method for improving adhesion of normal pressure-sensitive adhesive tapes to oily or greasy substrates by treating the oil-contaminated substrate with a primer. This primer comprises a rubbery phase of an A-B-A triblock copolymer, such as a styrene-butadiene or styrene-isoprene block copolymer, and a resin blend of a resin compatible with the conjugated diene portion of the block copolymer and a resin compatible with the monovinyl aromatic hydrocarbon portion of the block copolymer (i.e., styrene). These components are placed in a solution, then applied as an aerosol to render the oil-contaminated surface stable for subsequent adhesion by a pressure-sensitive adhesive. This patent states that the conventional approach to adhering to oil-contaminated surfaces is a complicated and time-consuming clean-up prior to being adhered to by a conventional pressure-sensitive adhesive. However, the primer solution to the problem of oil contaminated surfaces proposed in this patent is still somewhat time consuming and impractical for most consumer applications.

U.S. Pat. No. 4,080,348 describes a pressure-sensitive adhesive composition which is stated to have superior "finger tack" as well as the ability to adhere to oily surfaces, such as skin. The adhesive disclosed contains a high proportion of simple diblock styrene-isoprene block copolymer admixed with a minor portion of a triblock styrene-isoprene-styrene or styrene-butadiene-styrene linear block copolymer tackified with solid tackifying resins. The specific formulations exemplified were alleged to have superior finger tack and the ability to adhere to skin.

Generically, the art has recognized adhesive compositions based on block copolymers of polyvinyl arenes blocks and polydiene blocks, as per the U.S. Pat. No. 4,080,348 above. However, most of the block copolymer-based adhesive compositions specifically taught in the art are based on polyvinyl arene blocks of polystyrene and polydiene blocks of either polybutadiene or polyisoprene or hydrogenated versions thereof. Continued work in the field has identified specific adhesive formulation based on these block copolymers as having particular properties useful in a variety of particular end uses. For example, U.S. Pat. No. 3,935,338 describes typical elastomeric structures having polyisoprene and polybutadiene elastomeric blocks in various configurations used in adhesive compositions for high temperature applications. The adhesive in this patent is hot-melt applied. The adhesive is tackified with a tackifying resin compatible with the diene elastomeric block B, and a second reinforcing resin compatible with the monoalkenyl arene block, which second resin has a higher softening point than the first resin. It is stated that this formulation provides an adhesive that has superior high-temperature performance as a pressure-sensitive adhesive. The specific elastomeric block compatible tackifying resin exemplified in this patent has a softening point of about 95° C. Higher softening point resins were not characterized as being compatible with the elastomeric midblock. The limited teaching in this patent is exemplary of an underlying problem in the art. Resins having higher softening points have generally been found to be incompatible with the isoprene block copolymer elastomeric midblock, even when lower molecular weight versions of the same resin do not display this compatibility problem. Generally, adhesives tackified solely with these high softening point resins exhibit unacceptable aging and high temperature adhesive performance. The ability to use these higher softening point resins, that otherwise chemically tend to be midblock compatible resins, would be extremely desirable in terms of obtaining stable high temperature adhesives.

An alternative approach to heat stability is proposed in U.S. Pat. No. 4,028,292, which uses a heat-stabilizing additive to improve the high-temperature performance of a conventional block copolymer-based pressure-sensitive adhesive. This patent notes that the use of lower softening point materials to get acceptable pressure-sensitive adhesive processing and performance at lower temperatures leads to the adhesive having unacceptable strength in the temperature range of 100°–150° F.

U.S. Pat. No. 4,652,491 discusses an adhesive designed to firmly adhere to polyolefin surfaces. The adhesive composition described is a blend of a block copolymer of polystyrene and polybutadiene blocks, with styrene-butadiene random copolymer or natural rubber, admixed with a lower softening point tackifier. It is noted in this patent that certain higher softening point tackifiers are ineffective in providing an adequate adhesive when used on their own, however, these tackifiers allegedly may be used in minor amounts when employed with effective amounts of lower softening point, elastomeric block compatible, tackifiers.

U.S. Pat. No. 4,792,584 describes an adhesive composition based on a block copolymer of polystyrene and polybutadiene blocks, having a specific ratio of 1,2 butadiene content to vinyl aromatic content. It is also disclosed in this patent that creep resistance of the adhesive can be improved by the use of reinforcing resins compatible with the styrene-block of the copolymer. No oil-contamination tolerance abilities or heat aging stability are attributed to these adhesive compositions.

U.S. Pat. No. 4,810,574 describes a diaper tape adhesive formulated from a blend of a block copolymer of polystyrene and polybutadiene with about 30–50% of a petroleum hydrocarbon resin having a piperylene component, with a chain transfer component, and a vinyl substituted styrene having a softening point from 0°–40° C. This adhesive is described as providing a tape that will repositionably, rather than firmly, adhere to a polyolefin material, particularly a diaper polyethylene cover sheet. The patent attributes no oil-contamination tolerance, heat stability or age stability to its adhesives. Generally the art fails to identify the above noted problems or suggest a solution thereto.

BRIEF SUMMARY OF THE INVENTION

There is provided a pressure sensitive adhesive comprising 100 parts of an elastomeric phase comprised predominately of novel block copolymer of 7 to 50 weight percent of a polyvinylarene, preferably polystyrene, and 93 to 50 weight percent of a 2-alkyl substituted 1,3-butadiene block portion having a Tg of less than about minus 65° C., wherein the alkyl is generally a $C_3$ to $C_2$ alkyl and from 0 to 300 parts of a tackifying resin component. The adhesive provides unique adhesive properties and stability of adhesive properties.

DETAILED DESCRIPTION OF THE INVENTION

The invention AB block copolymers comprise a novel elastomeric B block comprised of an alkyl 2-substituted butadiene having a Tg of less than about minus 65° C. wherein the alkyl group is preferably a $C_3$ to $C_{12}$ linear alkyl and more preferably a $C_3$ to $C_{10}$ linear alkyl.

The invention alkyl 2-substituted butadiene monomers can be produced by standard synthesis techniques. These monomers can then be incorporated into the block copolymer using processes involving organic alkali metal initiators (preferably organolithium initiators) resulting in the formation of living polymer chains of the aliphatic diene and/or the aromatic vinyl. Exemplary organolithium initiators include ethyllithium, n-propyllithium, isopropyllithium, n-butyllithium, sec-butyllithium, tert-octyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-heptylcyclohexyllithium, 4-cyclopentylbutyllithium, hexyllithium, lithium complexes of condensed or non-condensed aromatic rings, oligobutadienyldilithium and oligoisobutylenyldilithium in the living state, and the like. Generally, sec-butyllithium is preferred, as per U.S. Pat. No. 3,231,635. Generally, the molecular weight of the polymer can be controlled by the concentration of the initiators. Also, varying molecular weight ranges can be obtained by adding the initiator step-wise in the reaction or by using combinations of initiators. Generally, the initiator concentration is from 0.25 to 50 millimoles per 100 grams of monomer.

The organolithium initiator generally provides predominantly cis-1,4 linkage of the alkyl substituted butadiene. This reaction can be altered by the addition of a Lewis base component to increase the percentage of 1,2-butadiene linkages, as discussed, for example, in U.S. Pat. No. 3,140,278. Examples of ether compounds suitable for this purpose are, for instance, cyclic ethers such as tetrahydrofuran, tetrahydropyran and 1,4-dioxane; aliphatic monoethers such as diethyl ether and dibutyl ether; aliphatic polyethers such as ethyleneglycoldimethyl ether, ethyleneglycoldiethyl ether, ethyleneglycoldibutyl ether, diethyleneglycoldiethyl ether and diethyleneglycoldibutyl ether; aromatic ethers such as diphenyl ether and anisole, and the like. Examples of suitable tertiary amine compounds are, for instance, triethylamine, tripropylamine, tributylamine, and other compounds such as N,N,N',N'-tetramethylethylenediamine, N,N-diethylaniline, pyridine and quinoline, and the like.

The polymerization reaction occurs in an inert diluent of aromatic hydrocarbons such as toluene, benzene, xylene and/or aliphatic hydrocarbons such as n-hexane, n-pentane, isooctane, cyclopentane or cyclohexane. The temperature of the reaction is generally maintained between about −20° C. and 150° C., for about 1–48 hours. Generally higher reaction temperatures will result in a higher proportion of 1,2-substituted butadiene linkages. The pressure of the reaction solution should be maintained at a level sufficient to keep the mixture in the liquid phase.

The polymerization reaction can proceed sequentially, with the step-wise addition of monomers, or simultaneously, with mixtures of monomers having substantially differing rates of reaction.

Linear and non-linear block copolymers can also be formed with the use of coupling agents. These agents can be used to join living polymer chains, created by one or more sequential or simultaneous reactions, or as an intermediary reaction step. The degree of coupling, or coupling efficiency, can be controlled by the ratio of coupling agent-to-living polymer ends. The type of coupling is controlled by the degree of functionality of the coupling agent and coupling agent concentration. Exemplary coupling agents include those capable of forming star blocks, such as polyalkenyl aromatic coupling agents, such as: 1,2-divinylbenzene; 1,3-divinylbenzene; 1,4-divinylbenzene; 1,2,4-trivinylbenzene; 1,3-divinylnaphthalene; 1,8-divinylnaphthalene; 1,3,5-trivinylnaphthalene; 2,4-divinylbiphenyl; 3,5,4'-trivinylbiphenyl; 1,2-divinyl-3,4-dimethylbenzene; 1,5,6-trivinyl-3,7-diethylnaphthalene; 1,3-divinyl-4,5,6-tributylnaphthalene; 2,2'-divinyl-4-ethyl-4'-propylbiphenyl; and the like, as described, for example, in U.S. Pat. No. 4,391,949. Other difunctional coupling agents include 1,2-dibromoethane or dicarboxylic acid diesters, for example, dimethyl adipate, diethyl adipate, di-n-butyl adipate, di-n-dioctyl maleate. Difunctional coupling reaction coupling efficiency can be controlled to provide mixtures of linear diblock and triblock copolymers. Coupling agents suitable for forming radial block copolymers include those containing 3 to 4 halogen atoms, such as silicon tetrachloride, tin tetrachloride, trichlorobenzene, and the like. The coupled product may then be further reacted with monoalkenyl aromatic hydrocarbons or alkyl substituted butadiene as is known in the art, see, for example, U.S. Pat. No. 4,010,226. These coupling agents can also be used to form polyfunctional initiators as per known methods, such as described in U.S. Pat. No. 3,957,913. The use of coupling agents allows wide variation in molecular weight and branching, with the possibility of much shorter reaction times than with single sequential addition. The reaction can be halted and the polymer precipitated with conventional polar solvents.

The AB type, linear, star, radial or otherwise branched, block copolymer is formed of A blocks of a monoalkenyl aromatic hydrocarbon or monoalkenyl arene, mainly polystyrene or polystyrene derivatives, having a molecular weight between 4,000 and 50,000, preferably between 7,000 and 30,000. This alternating diblock version of this AB block copolymer can also be described as $(A-B)_n$-X, X-$(A-B)_n$-A, or B-$(A-B)_n$-X, where n is 1 to 30 and X is an optional coupling agent. The A block content is from about 7 to 50 weight percent of the block copolymer, preferably 7 to 30 weight percent of styrene. The A block can also be formed predominantly of alpha-methyl styrene, t-butyl styrene and other ring alkylated styrenes and may also contain minor proportions of other monomers, such as conjugated diene. The B blocks are comprised predominately of a 2-alkyl substituted 1,3-butadiene, the alkyl group is a $C_3$ to $C_{12}$ alkyl moiety, preferably a $C_3$ to $C_{12}$ linear alkyl and most preferably a $C_3$ to $C_{10}$ linear alkyl. The B groups have an average molecular weight of from about 5,000 to 500,000, preferably from about 50,000 to about 300,000. Minor proportions of other monomers may be included in the B blocks, e.g, residue arenes or other conjugated dienes. B groups of other conjugated dienes might also be employed in amounts up to about 80 percent of the total B blocks. When these novel block copolymers are employed in adhesive compositions, other AB type block copolymer elastomers or other conventional elastomers, preferably diene elastomers, may be employed in amounts up to 75 percent of the elastomeric phase, however, preferably at less than 50 percent of the elastomeric phase of the adhesive. Preferably, these conventional AB type block copolymers are A-B diblock or A-B-A triblock copolymers of conventional dienes, such as isoprene, butadiene or ethylene-butylene, or combinations thereof.

The novel block copolymer of the invention in an adhesive composition further comprises a tackifying material, which can comprise solid tackifying resin or a blend of solid tackifying resin and liquid resin, or a blend of solid tackifying resin and liquid plasticizer and/or liquid tackifying resin. The tackifying material component generally comprises from 20 to 300 parts per 100 parts of elastomeric phase. The solid or liquid tackifying resins are preferably selected from the group of resins at least partially compatible with the B blocks of the elastomeric block copolymers of this invention. However, A block compatible resins can be used, particularly when blended with B block compatible resins. Such tackifying resins include those aliphatic hydrocarbon resins made from the polymerization of a feed stream consisting mainly of unsaturated species containing four to six carbon atoms; rosin esters and rosin acids; mixed aliphatic/aromatic tackifying resins; polyterpene tackifiers; and hydrogenated tackifying resins. The hydrogenated resins can include resins made from the polymerization and subsequent hydrogenation of a feedstock consisting mostly of dicyclopentadiene; resins produced from the polymerization and subsequent hydrogenation of pure aromatic feedstocks such as styrene, alpha-methylstyrene, vinyl toluene; resins fashioned from the polymerization and subsequent hydrogenation of an unsaturated aromatic feedstream wherein the feedstream mainly contains species having from 7 to 10 carbon atoms; hydrogenated polyterpene resins; and hydrogenated aliphatic and aliphatic/aromatic resins and rosin esters. Preferred tackifying resins include the aliphatic hydrocarbon resins and the hydrogenated resins. Especially preferred are the aliphatic hydrocarbon resins.

The liquid plasticizers suitable for use in the adhesive compositions of this invention include naphthenic oils and paraffinic oils.

Preferably, the solid tackifying resin used is one that is compatible with the elastomeric conjugated diene B block and is preferably a tackifying resin having a softening point between about 80° C. and 115° C., such as is produced from polymerization of a stream of aliphatic petroleum derivatives of dienes and monoolefins having 4 to 9 carbon atoms as is disclosed in U.S. Pat. Nos. 3,935,338 and 3,954,692, the substance of which are incorporated herein by reference. Particularly preferred are tackifying resins resulting from the copolymerization of a feed comprised predominately of $C_5$ carbon atom species such as piperylene, isoprene and 2-methyl-2-butene.

The adhesive preferably is tackified with solid tackifying resin or solid tackifying resin with liquid plasticizer or liquid resin of the above-described preferred types.

A particularly preferred adhesive of the invention is one tackified with one of the above-described solid tackifiers compatible with the novel B block and having a softening point of greater than 100° C. These high softening point solid tackifiers are generally not preferred in the art as they are incompatible with most AB block copolymer elastomers, particularly after aging the composition and especially when used as the sole tackifying agents in the adhesive compositions. However, the desirability of these tackifiers is clear as their higher softening points lead to generally more heat-stable adhesives and the potential for higher shear adhesion. It has been found that the invention block copolymers have an unexpected degree of compatibility with these high softening point solid tackifiers, as compared to conventional AB block copolymers. Adhesives using high softening point resins have also been found to unexpectedly perform well at ambient conditions even on aging.

The invention block copolymers generally have also been found to provide adhesive compositions having a high degree of oil tolerance. These adhesives have been found to retain their adhesiveness to oil-contaminated surfaces that have as much as 0.1 to 0.2 mg oil per $cm^2$. This oil tolerance, however, does not have to be obtained by sacrificing tackiness and adhesive performance to non-oil-contaminated surfaces. The adhesives based on the novel 2-alkyl substituted butadiene block copolymers also provide excellent stability, initially and after aging at ambient and elevated temperatures, of the adhesion properties. This stability is noted against oil-contaminated surfaces, as well as non-oil-contaminated surfaces, particularly with the preferred high softening point, solid tackifying resin. An example of where this property would be desirable is as a diaper fastening tab where there is a great possibility of the adhesion surface becoming contaminated with baby oil. However, the diaper fastening tab must adequately adhere to a non-oil contaminated adhesion surface under normal use conditions.

Ideally, an adhesive should not lose a significant proportion of its adhesion values when aged. Adhesives formulated with the invention block copolymers have generally demonstrated values well within a lower limit of less than 25% reduction in adhesion. This stability is particularly good with adhesives using the preferred high softening point solid resins.

The adhesive composition can also contain conventional additives such as pigments, fillers, stabilizers, and antioxidants for the conventional purposes of these additives.

The invention elastomer can also be hydrogenated by conventional techniques for added age and heat stability.

Synthesis of 2-n-amyl-1,3-butadiene

The first monomer prepared was 2-n-amyl-1,3-butadiene. This monomer was prepared by reacting n-amylbromide with magnesium metal in t-butylmethylether solvent to form n-amyl magnesium bromide. The latter was then reacted with freshly distilled chloroprene (2-chloro-1,3-butadiene) in the presence of 1,3-Bis(-diphenyl phosphino) propane nickel dichloride as catalyst. After following the normal purification steps, the 2-n-amyl-1,3-butadiene was separated from the solvent by distillation at 65° C. and 45 mm Hg.

This procedure was followed to prepare 2-n-propyl-1,3-butadiene, 2-n-butyl-1,3-butadiene, 2-(2-ethylhexyl)-1,3-butadiene and 2-n-octyl-1,3-butadiene.

Formation of styrene-2-n-amyl-1,3-butadiene Block Copolymer

Ingredients used:

Solvent: reagent grade cyclohexane was purified by allowing to stand overnight over silica gel.

Styrene: pure monomer was purified by passing through an alumina column.

2-n-amyl-1,3-butadiene: monomer passed through an alumina column.

A solution of purified styrene was combined with purified cyclohexane. Sec-butyl lithium is added to titrate any impurities first, then the calculated amount of sec-butyl lithium was added as initiator. A golden color forms and the reaction temperature was maintained at 50°-60° C. The product at this point was living polystyryl lithium. The stirred reaction was allowed to remain at that temperature for about one hour. The purified 2-n-amyl-1,3-butadiene was titrated (to react any impurities) with sec-butyl lithium to 0.5° C. exotherm, and it was added to the styryl lithium or the styryl lithium was added to it. In the case of 2-n-amyl-1,3-butadiene, the preferred method was to add the latter to the styryl lithium. The color of the solution changes from a deep golden color to a lighter color. The reaction temperature was allowed to increase to 70° C. and was cooled if the temperature goes above that point. After stirring the product for about two more hours, a stoichiometric amount of dibromoethane (dissolved in pure cyclohexane) was added to effect the desired coupling reaction. The reaction mixture was allowed to stand for an additional two hours while stirring and was then terminated by the addition of a small amount of methanol.

In the case of sequential polymerization, the appropriate amounts of styrene and catalyst were used initially. The amount of 2-n-amyl-1,3-butadiene was doubled, which was then followed by adding the calculated amount of purified (with impurities titrated with sec-butyl lithium) styrene. The reaction becomes golden in color again, and was allowed to remain at 50°-60° C. for about two hours. Termination of the reaction was done by addition of methanol.

An antioxidant (Irganox TM 1076) was added to the polymer solution at the rate of two grams per hundred grams of the total polymer. The polymer was isolated from the solution by precipitation in isopropanol (2-3 times the volume of the polymer solution) and was isolated and dried in a vacuum oven at about 60° C.

The other block copolymers used were similarly formed and are set forth in Table 1. The invention elastomers had unexpectedly low $T_g$ values (e.g. less than $-65°$ C.). The branched 2-alkyl substituted 1,3-butadiene elastomers (H and I) had significantly higher $T_g$ values.

TABLE 1

| SAMPLE | POLYMER STRUCTURE & TARGET M.W. | DIBLOCK % | TRIBLOCK % | POLYMERIZATION | Tg °C. |
|---|---|---|---|---|---|
| A | Styrene(S)-2-n-propyl-1,3-butadiene-Styrene(S) 14,650  180,000  14,650 | 54 | 46 | coupled | −68.8 |
| B | S-2-n-butyl-1,3-butadiene-S 14,650  180,000  14,650 | 63 | 37 | coupled | −72.5 |
| C | S-2-n-amyl-1,3-butadiene-S 12,000  240,000  −12,000 | 57 | 43 | coupled | −75 |
| D | S-2-n-amyl-1,3-butadiene-S 9,800  150,000  9,800 | — | 100 | sequential | −75 |
| E | S-2-n-amyl-1,3-butadiene-S 14,000  280,000  14,000 | 46 | 54 | coupled | −75 |
| F | S-2-n-amyl-1,3-butadiene-S 10,800  10,800  134,000 | 25 | 75 | coupled | −75 |
| G | S-2-n-amyl-1,3-butadiene-S 14,600  180,000  14,600 | 45 | 55 | coupled | −75 |
| H | S-2-ethylhexyl-1,3 butadiene-S 40,000  320,000  40,000 | 72 | 28 | coupled | −49 |
| I | S-2-ethylhexyl-1,3-butadiene-S 14,650  180,000  14,600 | 46 | 54 | coupled | −49 |

Preparation and Coating of Adhesive Compositions

The desired amounts of elastomer and tackifiers are weighed into a wide-mouth glass jar equipped with a linered metal screw cap. To the elastomer-tackifier mixture is added Irganox 1076 antioxidant (available from Ciba-Geigy Corporation, Laramie, Wyo.) at the rate of two grams per 100 grams of solids. Toluene is then added to the above mixture to form a 50% solids solution. The jar is sealed tight and placed on a shaker for about 24 hours to effect complete solution.

The adhesive solution is coated on a 115 micron thick polypropylene backing using a handspread flat bed unit. The coated adhesive is then placed in a 66 degree centigrade, forced air oven for 10 minutes. The dried adhesive coat is generally 33.5 grams per sq. meter. Samples 2.54 cm wide are cut out of the handspread coating for testing.

The adhesives of this invention were prepared from the above elastomers and at least one tackifier. These adhesives were coated from a toluene solution (about 50% solids), as is known in the art. The adhesive was generally coated onto a polypropylene backing about 35 grams/m². Tackifiers used in the adhesives are listed below.

Nevtac TM 115 is a $C_5$ hydrocarbon resin with a softening point of about 115° C. available from Neville Chemical Company, Pittsburgh, Pa.

Nevtac TM 100 is a $C_5$ hydrocarbon resin with a softening point of about 100° C. available from Neville Chemical Company, Pittsburgh, Pa.

Escorez TM 1315 is a $C_5$ hydrocarbon resin with a softening point of about 115° C. available from Exxon Chemical Corporation, Houston, Tex.

Zonarez TM B-115 is a poly beta pinene (or polyterpene) resin with a softening point of about 115° C. available from Arizona Chemical Company, Panama City, Fla.

Wingtack TM TM 115 is a $C_5$ hydrocarbon resin with a softening point of about 115° C. available from Goodyear Tire and Rubber Company, Akron, Ohio.

Wingtack TM TM Plus is a $C_5$ hydrocarbon resin with a softening point of about 95° C. available from Goodyear Tire and Rubber Company, Akron, Ohio.

Wingtack TM 10 is a $C_5$ hydrocarbon resin with a softening point of about 10° C. available from Goodyear Tire and Rubber Company, Akron, Ohio.

Wingtack TM 95 is a $C_5$ hydrocarbon resin with a softening point of about 93° C. available from Goodyear Tire & Rubber Company, Akron, Ohio.

135 Degree Peel Adhesion from Partially Secured Oil-Contaminated Polyethylene Test panels consist of 2"×5" (5 cm×12.7 cm) clean steel panels which have had a strip of ¾" (1.9 cm) double-sided adhesive affixed along each 2" (5 cm) edge. A sheet of polyethylene (diaper backsheet polyethylene film) was laid down loosely over the test panel so that it lays flat without any wrinkles. The cross-direction of the polyethylene should be parallel to the long dimension of the test panel. The polyethylene was rolled down firmly onto the ¾" (1.9 cm) double-sided adhesive, and any excess which extends beyond the edge of the test panel was trimmed away.

The poly surface of the test panels was contaminated for testing by uniform spray application of a know amount of baby oil onto the panels. The amount of oil deposited was determined by weighing a set of panels before and after spraying and was generally between 0.12 and 0.19 mg/sq. cm. The amount of oil was shown in parenthesis in Tables 2 to 6 in mg/cm². Each sprayed panel was tested within 2 to 4 minutes of completion of oil spraying. This was noted as the initial readings in Tables 2 to 6.

Additional panels for comparison were prepared for testing as described above, but not oil sprayed.

Each strip of test tape measures 1"×2.5" (2.5 cm×6.5 cm) with a paper leader measuring 1"×8" (2.5 cm×20.3 cm) adhered to the final ¼" (0.6 cm) of the tape. This tape assembly was laid with its long dimension parallel to the long dimension of the panel so that the tape was about equidistant from each end of the panel and centered between each side. No additional pressure was exerted in laying down the tape.

The tape was immediately rolled down at 12" (30.5 cm) per minute with a single pass of a 100 gm rubber roller and was tested within 15 seconds of completion of rolldown. The tapes were also tested after heat aging (HA) for 15 days at 120° F. (49° C.).

Samples were peel tested using a tensile tester equipped with a fixture which will maintain the panel at an angle of 135 degrees throughout the peel. The sample was inserted into the 135 degree fixture with the paper leader gripped by the upper jaws of the tensile tester, and the crosshead was set at a constant speed of 12 inches (30.5 cm) per minute. The panel was moved to keep the point of peel separation in the same position relative to the fixture throughout the peel, and the peel continues until the tape was pulled free of the poly or until the crosshead had travelled 2½ inches (6.4 cm).

The average peel of each test specimen was recorded in grams/inch, and the average of four test specimens per lot of tape was reported as the tape peel adhesion value. The minimum acceptable peel adhesion value is about 30 N/m for the oil-contaminated surface. Using the same test procedure, tape peeled from a non-contaminated polyethylene surface must have a minimum peel adhesive value of about 40 N/m.

Table 2 shows the elastomer used from Table 1 with the parts in parentheses. The tackifier used was Nevtac TM 115, with parts as shown. The peel adhesion values for oil-contaminated surfaces were tested initially, and after heat aging, with the amount of oil shown in parentheses in both cases. The percent change in adhesion when heat aged (%Δ) stayed approximately the same or increased for invention examples 1–7 and 13.

The comparative examples (C8–C12) showed unacceptable adhesion to oil-contaminated surfaces and/or aged poorly.

Likewise, with the invention adhesives acceptable peel adhesion values were obtained against non-oil-contaminated surfaces with good aging characteristics. However, the comparative examples yielded adhesives with low peel values and/or poor aging against non-oil contaminated surfaces.

TABLE 2

| | | | Peel adhesion values - N/m (Oil Amount in mg/cm²) | | | Peel adhesion values NO OIL | | |
|---|---|---|---|---|---|---|---|---|
| EXAMPLE | ELASTOMER | NEVTAC TM 115 | INITIAL N/m | HA N/m | % Δ | INITIAL N/m | HA N/m | % Δ |
| 1 | E(9) | 10.8 | 52.9(.14) | 57.8(.14) | +9% | 59.7 | 111.7 | +86% |
| 2 | C(7) | 8.5 | 80.4(.14) | 83.3(.14) | +4 | 81.3 | 125.4 | +55 |
| 3 | F(10) | 12 | 29.4(.14) | 46.1(.14) | +56 | 19.6 | 33.3 | +71 |
| 4 | D(10) | 12 | 42.1(.14) | 49.0(.14) | +16 | 91.1 | 117.6 | +29 |
| 5 | B(12.5) | 15 | 53.9(.14) | 54.9(.14) | +1 | 45.1 | 79.4 | +75 |
| 6 | A(12.5) | 15 | 32.3(.14) | 48.0(.14) | +46 | 44.1 | 63.7 | +35 |

TABLE 2-continued

| EXAMPLE | ELASTOMER | NEVTAC ™ 115 | Peel adhesion values - N/m (Oil Amount in mg/cm²) | | | Peel adhesion values NO OIL | | |
|---|---|---|---|---|---|---|---|---|
| | | | INITIAL N/m | HA N/m | % Δ | INITIAL N/m | HA N/m | % Δ |
| 7 | G(12.5) | 15 | 55.9(.14) | 61.7(.14) | +10 | 92.1 | 124.5 | +36 |
| C8 | H(12.5) | 15 | 22.5(.14) | 15.7(.14) | −31 | 8.8 | 16.7 | +83 |
| C9 | I(12.5) | 15 | 28.4(.14) | 16.7(.14) | −40 | 16.7 | 21.6 | +29 |
| C10 | Kraton ™ 1112[2] (12.5) | 15 | 62.7(.14) | 51.0(.14) | −19 | 12.7 | 1.0 | −91 |
| C11 | Kraton ™ 1107[3] (20) | 15 | — | 60.8(.13) | — | — | 0 | |
| C12 | Kraton ™ 1111[4] (20) | 15 | 66.6(.13) | 67.6(.13) | +2 | 99.0 | 3.9 | −96 |
| 13 | C(12.5) | 15[1] | 56.8(.12) | 55.9(.12) | −2 | 83.3 | 76.4 | −9 |

[1] Zonarez ™ 115
[2] Kraton ™ 1112 is a styrene-isoprene-styrene block copolymer (Tg = −59° C.), 14%s, about 40% diblock available from Shell Chemical Co., Houston, Texas.
[3] Kraton ™ 1107 is a styrene-isoprene-styrene block copolymer (Tg = −59° C.), 14%s, about 15% diblock available from Shell Chemical Co., Houston, Texas.
[4] Kraton ™ 1111 is a styrene-isoprene-styrene block copolymer (Tg = −59° C.), 22%s, about 15% diblock available from Shell Chemical Co., Houston, Texas.

Table 3 exemplifies adhesives formulated with Nevtac ™ 115 and minor added amounts of a liquid tackifier (Wingtack ™ 10). The adhesive formulations using the invention elastomers, examples 14–19, still showed good adhesion to both oil-contaminated surfaces and non-oil-contaminated surfaces.

Invention example 24 demonstrates acceptable performance using Escorez ™ 1315 as the tackifier. Comparative example C25, like C20–C22, displayed unacceptable peel adhesion performance (when aged) to non-oil-contaminated surfaces.

TABLE 3

| ELASTOMER | ELASTOMER | NEVTAC ™ 115 | WINGTACK ™ 10 | OIL | | | NO OIL | | |
|---|---|---|---|---|---|---|---|---|---|
| | | | | IN. N/m (oil mg/cm²) | HA N/m (oil, mg/cm²) | % Δ | IN. N/m | HA N/m | % Δ |
| 14 | F(12.5) | 15 | 2.5 | 51.9(.12) | 48.0(.12) | −8% | 57.8 | 57.8 | 0% |
| 15 | D(12.5) | 15 | 2.5 | 78.4(.12) | 62.7(.12) | −7 | 167.6 | 166.6 | 0 |
| 16 | F(12.5) | 15 | 3.8 | 60.8(.12) | 47.0(.12) | −23 | 78.4 | 72.5 | −7 |
| 17 | F(12.5) | 15 | 5.0 | 54.9(.12) | 47.0(.12) | −13 | 82.3 | 81.3 | −2 |
| 18 | D(12.5) | 15 | 3.8 | 79.4(.12) | 76.4(.12) | −4 | 181.3 | 145.0 | −20 |
| 19 | D(12.5) | 7.5 | 1.25 | 63.7(.16) | 56.8(.16) | −10 | 179.3 | 152.9 | −15 |
| C20 | Kraton ™ 1107 (17) | 15 | 10 | 51.0(.16) | 48.0(.16) | −6 | 30.4 | 2.0 | −94 |
| C21 | Kraton ™ 1107 (20) | 15 | 2.5 | 68.6(.16) | 61.7(.16) | −10 | 42.1 | 1.0 | −98 |
| C22 | Kraton ™ 1112 (20) | 15 | 2.5 | 79.4(.16) | 69.6(.16) | −12 | 31.4 | 1.0 | −96 |
| Wingtack ™ 115 | | | | | | | | | |
| 23 | C(12.5) | 15 | 2.5 | 80.4(.12) | 76.4(.12) | −5 | 117.6 | 121.5 | +4 |
| ESCOREZ ™ 1315 | | | | | | | | | |
| 24 | B(12.5) | 15 | 2.5 | 48.0(.14) | 55.9(.14) | +17 | 90.2 | 100.0 | +11 |
| C25 | Kraton ™ 1112 (10) | 6.4 | 3.6 | 76.4(.12) | 70.6(.12) | −7 | 149.0 | 2.9 | −98% |

The comparative examples C20–C22 displayed unacceptable peel adhesion to non-oil-contaminated surfaces when the elastomer phase was a conventional elastomer or a 2-branched alkyl substituted, 1,3-butadiene elastomer (H and I).

Invention example 23 showed good performance using Wingtack ™ 115 as the tackifier.

Table 4 exemplifies adhesive formulations similar to examples 15, 18 and 19, however, using a blend of an invention elastomer with conventional polyisoprene AB block copolymer elastomers. These examples demonstrate that, even blended as a relatively minor portion of the elastomer phase, the invention elastomer can provide adhesives with superior performance to both oil-contaminated surfaces and non-oil-contaminated surfaces.

TABLE 4

| ELASTOMER | ELASTOMER | ELASTOMER II | NEVTAC ™ 115 | WINGTACK ™ 10 | OIL (0.16 mg/cm²) | | | NO OIL | | |
|---|---|---|---|---|---|---|---|---|---|---|
| | | | | | IN. N/m | HA N/m | % Δ | IN. N/m | HA N/m | % Δ |
| 26 | D(6.25) | 8.5[1] | 15 | 7.25 | 56.8 | 49.9 | −12% | 146.9 | 125.4 | −14% |
| 27 | D(3.1) | 15[1] | 17 | 10.9 | 46.1 | 44.1 | −3 | 195.0 | 129.4 | −34 |
| 28 | D(6.25) | 102 | 16 | 5.75 | 54.9 | 49.0 | −10 | 131.3 | 131.3 | 0 |
| 29 | D(3.1) | 15[2] | 17 | 10.9 | 51.0 | 49.0 | −5 | 259.7 | 226.4 | −13 |
| 30 | D(9.4) | 5[2] | 15 | 2.6 | 65.7 | 55.9 | −14 | 150.0 | 134.3 | −10 |

TABLE 4-continued

| ELASTOMER | ELASTOMER | ELASTOMER II | NEVTAC TM 115 | WINGTACK TM 10 | OIL (0.16 mg/cm²) | | | NO OIL | | |
|---|---|---|---|---|---|---|---|---|---|---|
| | | | | | IN. N/m | HA N/m | % Δ | IN. N/m | HA N/m | % Δ |
| 31 | D(9.4) | 5² | 15 | 2.6 | 53.9 | 57.8 | +7 | 138.2 | 132.3 | −4 |

[1] Kraton TM 1107
[2] Kraton TM 1112

The examples in Table 5 demonstrate the use of a lower softening point (95° C.) resin with the invention elastomers. These adhesive formulations still displayed good adhesion to oil-contaminated surfaces. The adhesion to the thin polyethylene non-oil-contaminated surface was quite high and generally caused the thin (conventional diaper grade) polyethylene film to deform, however, these adhesives would function adequately against stronger films. The 2-alkyl substituted dienes, with branched alkyls, C38 and C39, did not adequately adhere to oil-contaminated surfaces.

for 3 hours at 60° C. The tape samples were exposed to the vapors of a 2% solution of osmium tetroxide in water for several hours prior to embedding in order to pre-stain the adhesive. Thin sections, approximately 500 Angstroms thick, for TEM analysis were obtained by cryo-ultramicrotomy at a sample temperature of −100° C. using a Reichert Ultracut TM microtome with an FC4 cryo attachment. A Diatome TM diamond knife having a stainless steel boat was used. Sections were floated off onto a water/dimethylsulphoxide mixture and picked up onto 700 mesh copper grids. A JEOL 100

TABLE 5

| ELASTOMER | ELASTOMER | WINGTACK TM PLUS | OIL | | | NO OIL | | |
|---|---|---|---|---|---|---|---|---|
| | | | IN. oil (.12 mg/cm²) N/m | HA oil (.14 mg/cm²) N/m | % Δ | IN. Kg/m | HA Kg/m | % Δ |
| 32 | D(10) | 12 | 53.9 | 46.1 | −12% | * | * | — |
| 33 | E(9) | 10.8 | 73.5 | 76.4 | +3 | * | 357.7 | — |
| 34 | C(7) | 8.4 | 87.2 | 68.6 | −21 | * | * | — |
| 35 | B(12.5) | 15 | 74.5 | 63.7 | −14 | 258.7 | 267.3 | +4 |
| 36 | A(12.5) | 15 | 54.9 | 51.0 | −6 | 212.7 | 231.3 | +9 |
| 37 | G(12.5) | 15 | 74.5 | 62.7 | −16 | * | * | — |
| C38 | H(12.5) | 15 | 26.5 | 21.6 | −19 | 56.8 | 58.8 | −3 |
| C39 | I(12.5) | 15 | 30.4 | 22.5 | −25 | 57.8 | 50.0 | −14 |

*the polyethylene stretched

Table 6 demonstrates the use of a hydrocarbon resin with a softening point of about 100° C. in adhesive formulations using the invention elastomers. This resin provided adhesives with the invention elastomers (examples 40–43) that exhibited good, stable adhesion performance to both an oil-contaminated surface and a non-oil-contaminated surface. The 2-alkyl substituted, branched alkyl, diene elastomer adhesives (C44 and C45) performed inadequately to both the oil-contaminated surface and the non-oil-contaminated surface in terms of adhesion levels.

CX electron microscope operated at 100 Kv was used to examine the sections.

Figure 1:
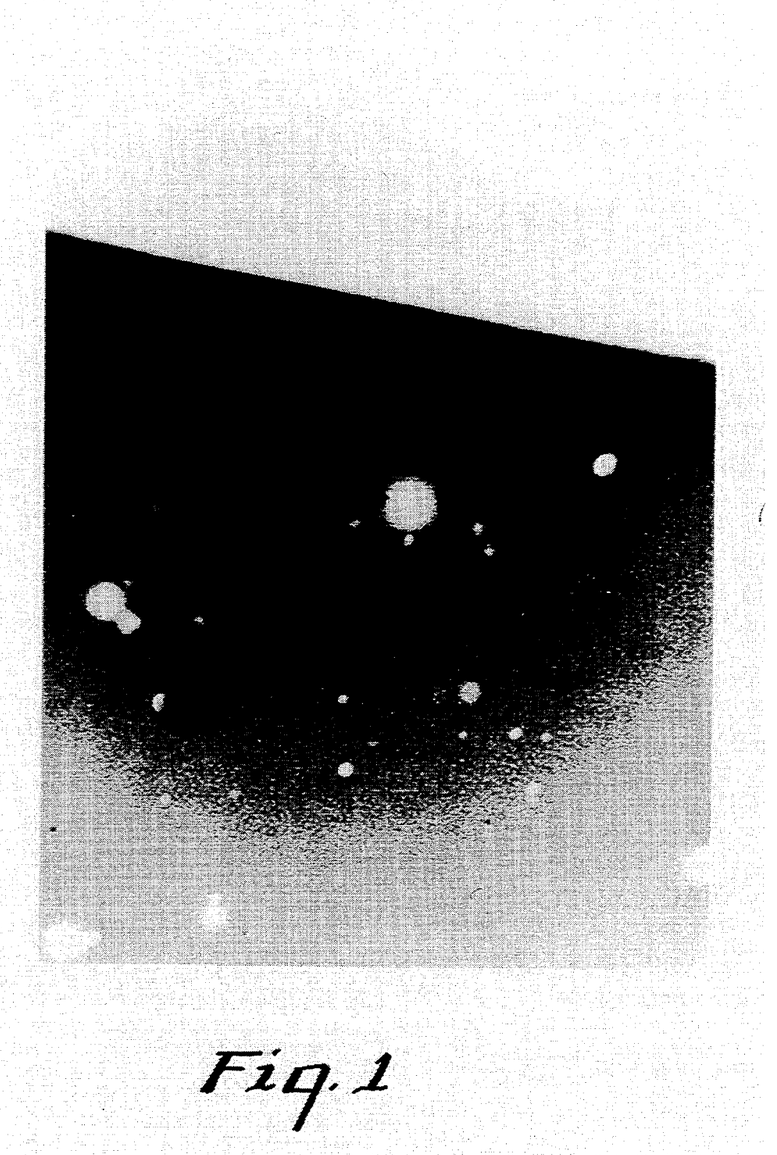
FIG. 1 is an electron microscope picture of heat-aged invention adhesive.

FIG. 1 shows the amyl-butadiene based elastomer adhesive after heat aging. The adhesive appears generally homogenous with some minor inclusions.

Figure 2:
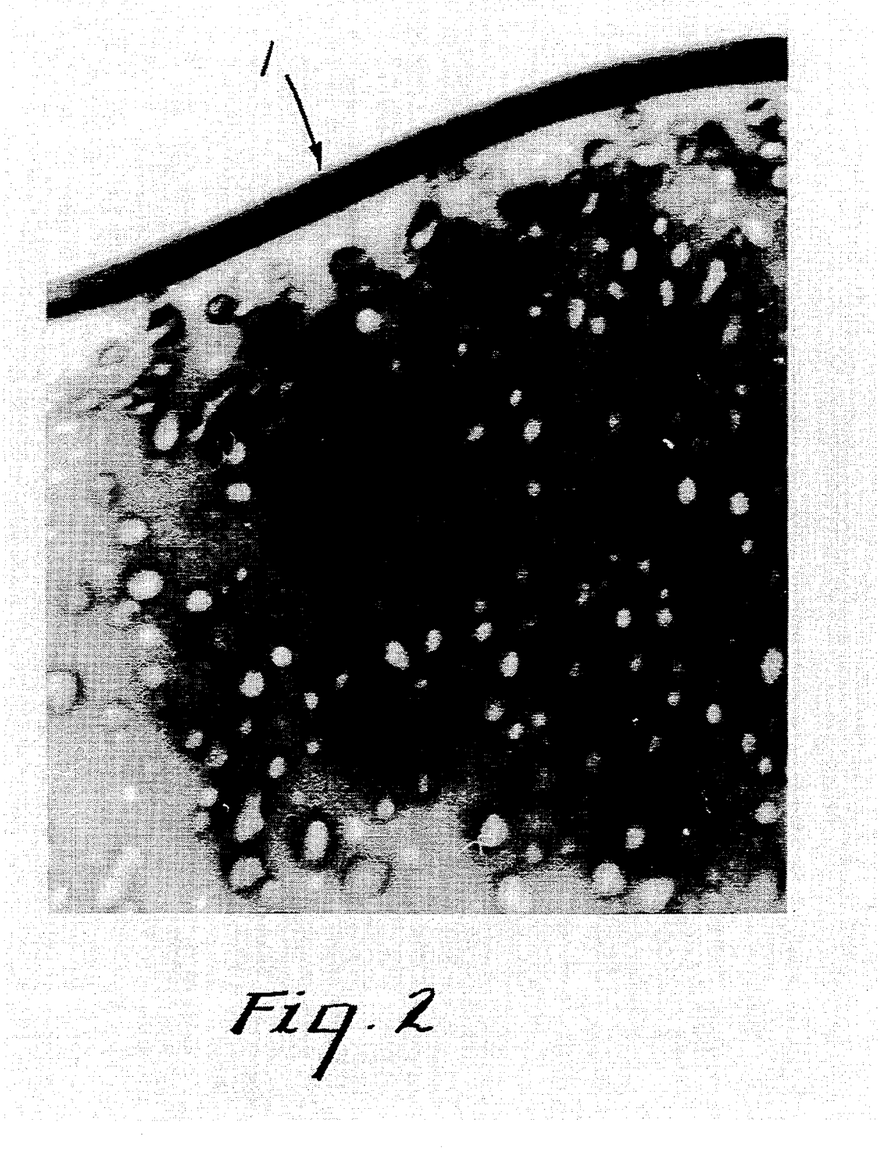
FIG. 2 is an electron microscope picture of heat-aged adhesive formed with a conventional isoprene block copolymer elastomer.

FIG. 2 shows the isoprene elastomer based adhesive after heat aging. This adhesive shows a distinct included phase and a separate thin layer 1 over the adhesive. This layer 1 is believed to be tackifier that has phase separated.

The various modifications and alterations of this in-

TABLE 6

| ELASTOMER | ELASTOMER | NEVTAC TM 100 | OIL (0.14 mg/cm²) | | | NO OIL | | |
|---|---|---|---|---|---|---|---|---|
| | | | IN. N/m | HA N/m | % Δ | IN. N/m | HA N/m | % Δ |
| 40 | D(10) | 12 | 63.7 | 61.7 | −4% | 219.4 | 202.9 | −7% |
| 41 | B(12.5) | 15 | 78.4 | 65.7 | −15 | 103.9 | 121.5 | +13 |
| 42 | A(12.5) | 15 | 58.8 | 58.8 | — | 122.5 | 134.3 | +10 |
| 43 | G(12.5) | 15 | 60.8 | 64.7 | +6 | 247.0 | 270.5 | +10 |
| C44 | H(12.5) | 15 | 18.6 | 20.6 | +11 | 8.8 | 10.8 | +21 |
| C45 | I(12.5) | 15 | 19.6 | 29.4 | +50 | 12.7 | 20.6 | +56 |

EXAMPLES 46 AND 47

The morphology of an polystyrene-poly-2-n-amyl-butadiene-polystyrene block copolymer based adhesive and a polystyrene-polyisoprene-polystyrene block copolymer-based adhesive (PSAs) were examined by electron microscopy. The adhesives were tackified with a solid $C_5$ hydrocarbon tackifing resin with a softening point of about 115° C.

PSA tape samples were prepared for transmission electron microscopy (TEM) by embedding tapes in partially pre-cured Spurr TM epoxy embedding medium. The epoxy embedding medium was then cured vention will be apparent to those skilled in the art without departing from the scope and spirit of this invention, and this invention should not be restricted to that set forth herein for illustrative purposes.

I claim:

1. An oil-tolerant pressure-sensitive adhesive composition comprising:
   100 parts of an AB type block copolymer elastomeric phase wherein the AB type block copolymer comprises $(A-B)_n-X$, $X-(A-B)_n-A$ or $B-(A-B)_n-X$, where n is 1 to 30 and X is an optional coupling agent and with about 10 to about 40 weight percent of an A block portion, comprising block portions predominately, of vinylarene, and about 60 to about 90 weight percent of a B block portion comprised predominately of 2-alkyl substituted 1,3-butadiene wherein the B block portion has a Tg lower than about minus 65° C.; and 30 to 300 parts of at least one tackifying material at least partially compatible with the 2-alkyl substituted 1,3-butadiene B block portion, wherein said adhesive functionally adheres to surfaces free of oil and surfaces having up to 0.1 mg oil per cm$^2$.

2. The pressure-sensitive adhesive composition of claim 1 wherein the polyvinylarene A block portions are comprised of predominately styrene or styrene derivatives, and the B block alkyl substituent is a $C_3$ to $C_{12}$ alkyl group.

3. The pressure-sensitive adhesive composition of claim 2 wherein the B block alkyl substituent is a $C_3$ to $C_{10}$ linear alkyl.

4. The pressure-sensitive adhesive composition of claim 2 wherein the tackifying material comprises solid tackifying resin or solid tackifying resin with a liquid resin and/or plasticizing oil.

5. The pressure-sensitive adhesive of claim 4 wherein the solid tackifying resin is compatible with the B block.

6. The pressure-sensitive adhesive of claim 5 wherein the solid tackifying resin has a softening point of at least 90° C. preferably at least 100° C.

7. The pressure-sensitive adhesive of claim 1 wherein the B block alkyl substituent is a $C_3$ to $C_{10}$ linear alkyl.

8. The pressure-sensitive adhesive of claim 7 wherein the tackifying material comprises a tackifying resin compatible with the B block portions and with a softening point of at least 80° C. or said solid tackifying resin with a liquid resin and/or plasticizing oil.

9. The pressure-sensitive adhesive of claim 8 wherein the tackifying material comprises 30 to 150 parts of the adhesive composition.

10. The pressure-sensitive adhesive tape of claim 1 wherein the AB type block copolymer comprises a linear block copolymer predominately comprising an A-B diblock copolymer and/or an A-B-A triblock copolymer.

11. The pressure-sensitive adhesive of claim 1 wherein the A blocks have an average molecular weight between about 7,000 to 50,000 and the B blocks have an average molecular weight of from about 20,000 to 500,000.

12. The pressure-sensitive adhesive of claim 1 wherein the elastomeric phase comprises 0% to 70% of a conventional diene elastomer.

13. The pressure-sensitive adhesive of claim 8 wherein the B block is comprised predominately of 2-n-amyl-1,3-butadiene.

14. The pressure-sensitive adhesive of claim 1 wherein the B block is hydrogenated.

15. An oil-tolerant, pressure-sensitive adhesive tape comprising:
a backing;
100 parts of an AB type block copolymer elastomeric phase wherein the AB block copolymer comprises (A-B)$_n$-X, X-(A-B)$_n$-A or B-(A-B)$_n$-X, where n is 1 to 30 and X is an optional coupling agent and with about 10 to about 40 weight percent of an A block portion comprising block portions predominately, of vinylarene, and about 60 to about 90 weight percent of a B block portion comprised predominately of 2-alkyl substituted 1,3-butadiene wherein the B block portion has a Tg lower than about minus 65° C.; and 30 to 300 parts of at least one tackifying material at least partially compatible with the 2-alkyl substituted 1,3-butadiene B block portion, wherein said adhesive functionally adheres to surfaces free of oil and surfaces having up to 0.1 mg oil per cm$^2$.

16. The pressure-sensitive adhesive type of claim 15 wherein the polyvinylarene A block portions are comprised of predominately styrene or styrene derivatives, and the B block alkyl substituent is a $C_3$ to $C_{12}$ alkyl group.

17. The pressure-sensitive adhesive type of claim 16 wherein the B block alkyl substituent is a $C_3$ to $C_{10}$ linear alkyl.

18. The pressure-sensitive adhesive tape of claim 16 wherein the tackifying material comprises solid tackifying resin or solid tackifying resin with a liquid resin and/or plasticizing oil.

19. The pressure-sensitive adhesive tape of claim 18 wherein the solid tackifying resin is compatible with the B block.

20. The pressure-sensitive adhesive tape of claim 19 wherein the solid tackifying resin has a softening point of at least 90° C., preferably at least 100° C.

21. The pressure-sensitive adhesive tape of claim 15 wherein the B block alkyl substituent is a $C_3$ to $C_{10}$ linear alkyl.

22. The pressure-sensitive adhesive tape of claim 21 wherein the tackifying material comprises a tackifying resin compatible with the B block portions and with a softening point of at least 80° C. or said solid tackifying resin with a liquid resin and/or plasticizing oil.

23. The pressure-sensitive adhesive tape of claim 22 wherein the tackifying material comprises 30 to 150 parts of the adhesive composition.

24. The pressure-sensitive adhesive tape of claim 15 wherein the AB type block copolymer comprises a linear block copolymer predominately comprising an A-B diblock copolymer and/or an A-B-A triblock copolymer.

25. The pressure-sensitive adhesive tape of claim 15 wherein the A blocks have an average molecular weight between about 7,000 to 50,000 and the B blocks have an average molecular weight of from about 20,000 to 500,000.

26. The pressure-sensitive adhesive tape of claim 15 wherein the elastomer phase comprises 0% to 70% of a conventional diene elastomer.

27. The pressure-sensitive adhesive tape of claim 22 wherein the B block is comprised predominately of 2-n-amyl-1,3-butadiene.

28. The pressure-sensitive adhesive tape of claim 15 wherein the B block is hydrogenated.

* * * * *

UNITED STATES PATENT AND TRADEMARK OFFICE
CERTIFICATE OF CORRECTION

PATENT NO.: 5,360,855

DATED: November 1, 1994

INVENTOR(S): Ramsis Gobran

It is certified that error appears in the above-identified patent and that said Letters Patent is hereby corrected as shown below:

Col. 3, line 22, "C3" should read --$C^3$--.

Col. 3, line 22, "$C_2$" should read --$C_{12}$--.

Col. 7, line 5, this sentence is a paragraph heading and should be underlined or in bold characters.

Col. 7, line 13, "purification :steps," should read --purification steps,--.

Col. 7, line 20, this sentence is a paragraph heading and should be underlined or in bold characters.

Col. 8, line 59, this sentence is a paragraph heading and should be underlined or in bold characters.

Col. 8, line 62, "linered" should read --liner--.

Col. 9, line 41, this sentence is a paragraph heading and should be underlined or in bold characters.

Col. 11, Table 4, under "Elastomer 28, Elastomer II", "102" should read --$10^2$--.

Signed and Sealed this

Sixteenth Day of July, 1996

Attest:

BRUCE LEHMAN

Attesting Officer

Commissioner of Patents and Trademarks